US006466783B2

(12) United States Patent
Dahm et al.

(10) Patent No.: US 6,466,783 B2
(45) Date of Patent: Oct. 15, 2002

(54) VISUAL INTERFACE TO MOBILE SUBSCRIBER ACCOUNT SERVICES

(75) Inventors: Cynthia N. Dahm, Palo Alto; Gregory Heumann, San Mateo; Bruce K. Martin, Jr.; Alain S. Rossmann, both of Palo Alto, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/093,944

(22) Filed: Jun. 8, 1998

(65) Prior Publication Data

US 2001/0014615 A1 Aug. 16, 2001

Related U.S. Application Data

(63) Continuation-in-part of application No. 08/570,210, filed on Dec. 11, 1995, now Pat. No. 5,809,415.

(51) Int. Cl.[7] .................. H04M 3/42; H04M 11/00; H04J 3/16

(52) U.S. Cl. .............. 455/414; 455/405; 455/566; 709/229; 370/466

(58) Field of Search ................. 455/412, 418, 455/419, 420, 38.1, 566, 517, 405, 406, 4, 408, 414, 407, 458; 709/227, 228, 229; 379/114.29, 114.28

(56) References Cited

U.S. PATENT DOCUMENTS 4,787,028 A * 11/1988 Finfrock et al. ............ 710/105
4,812,843 A * 3/1989 Champion, III et al. .... 340/905
5,008,925 A * 4/1991 Pireh ........................ 455/552

(List continued on next page.)

FOREIGN PATENT DOCUMENTS

EP 0646856 A2 4/1995
EP 0691619 A2 1/1996
EP 0646856 A3 12/1996

(List continued on next page.)

OTHER PUBLICATIONS

Kaashoek et al., Dynamic Documents: Mobile Wireless Access to WWW, IEEE Workshop on Mobile Computing Systems & Applications, pp. 1–6, Dec. 1994.*
Liljeberg et al., "Optimizing World–Web for weakly connected mobile workstations: An indirect approach", 2nd Int. Workshop on Services in Distributed & Networked Environment, pp. 132–138, Jun. 1995.*
Gessler et al., "PDAs as mobile WWW browsers", Computer Networks & ISDN Systems, vol.: 28, Issue 1–2, pp. 53–59, Dec. 1995.*

(List continued on next page.)

*Primary Examiner*—Vivian Chin
*Assistant Examiner*—Charles N. Appiah
(74) *Attorney, Agent, or Firm*—Blakely, Sokoloff, Taylor & Zafman LLP

(57) ABSTRACT

The present invention discloses a method and apparatus for providing visual interfaces to mobile subscriber account services suitable for mobile devices with a small screen and phone keypad communicating, via a wireless data network, with a remotely located server device providing the mobile subscriber account services. Apart from the interactive voice system and other related systems providing access to subscriber account services, the present invention provides direct visual interface to the mobile subscriber account services and allows mobile subscribers to efficiently, visually and interactively, for example, access desired information and place service requests, through the limited screen and phone keypad at anytime from anywhere with limited costs to the service providers and maximum convenience to mobile subscribers.

25 Claims, 8 Drawing Sheets

U.S. PATENT DOCUMENTS

| | | | | |
|---|---|---|---|---|
| 5,128,672 A | | 7/1992 | Kaehler | |
| 5,335,276 A | * | 8/1994 | Thompson et al. | 380/21 |
| 5,465,401 A | * | 11/1995 | Thompson | 455/558 |
| 5,548,636 A | * | 8/1996 | Bannister et al. | 379/201 |
| 5,555,446 A | * | 9/1996 | Jasinski | 455/517 |
| 5,560,008 A | | 9/1996 | Johnson et al. | |
| 5,577,100 A | * | 11/1996 | McGregor et al. | 455/406 |
| 5,577,103 A | * | 11/1996 | Foti | 455/412 |
| 5,577,209 A | | 11/1996 | Boyle et al. | |
| 5,579,535 A | * | 11/1996 | Orlen et al. | 455/421 |
| 5,581,595 A | | 12/1996 | Iwashita et al. | |
| 5,608,786 A | | 3/1997 | Gordan | |
| 5,623,605 A | | 4/1997 | Keshav et al. | |
| 5,671,354 A | | 9/1997 | Ito et al. | |
| 5,673,322 A | * | 9/1997 | Pepe et al. | 380/49 |
| 5,675,507 A | | 10/1997 | Bobo, II | |
| 5,708,828 A | * | 1/1998 | Coleman | 707/523 |
| 5,727,159 A | | 3/1998 | Kininis | |
| 5,740,252 A | | 4/1998 | Minor et al. | |
| 5,742,668 A | | 4/1998 | Pepe et al. | |
| 5,742,905 A | | 4/1998 | Pepe et al. | |
| 5,745,706 A | * | 4/1998 | Wolfberg et al. | 705/35 |
| 5,751,798 A | * | 5/1998 | Mumick et al. | 379/112 |
| 5,809,415 A | | 9/1998 | Rossmann | |
| 5,841,764 A | | 11/1998 | Roderique et al. | |
| 5,852,717 A | | 12/1998 | Bhide et al. | |
| 5,854,936 A | | 12/1998 | Pickett | |
| 5,867,153 A | * | 2/1999 | Grandcolas et al. | 345/326 |
| 5,884,284 A | * | 3/1999 | Peters et al. | 705/30 |
| 5,887,249 A | * | 3/1999 | Schmid | 379/91.01 |
| 5,909,485 A | * | 6/1999 | Martin et al. | 379/144 |
| 5,918,013 A | | 6/1999 | Mighdoll et al. | |
| 5,940,589 A | * | 8/1999 | Donovan et al. | 455/26.1 |
| 5,943,399 A | | 8/1999 | Bannister et al. | |
| 5,958,006 A | * | 9/1999 | Eggleston et al. | 709/219 |
| 5,995,606 A | | 11/1999 | Civanlar et al. | |
| 6,021,437 A | | 2/2000 | Chen et al. | |
| 6,023,698 A | | 2/2000 | Lavey, Jr. et al. | |
| 6,031,904 A | | 2/2000 | An et al. | |
| 6,035,189 A | * | 3/2000 | Ali-Vehmas et al. | 455/414 |
| 6,049,711 A | * | 4/2000 | Ben-Yehezkel et al. | 455/414 |
| 6,049,821 A | | 4/2000 | Theriault et al. | |
| 6,055,441 A | | 4/2000 | Wieand et al. | |
| 6,058,422 A | * | 5/2000 | Ayanoglu et al. | 709/226 |
| 6,065,120 A | * | 5/2000 | Laursen et al. | 713/201 |
| 6,085,105 A | * | 7/2000 | Becher | 455/517 |
| 6,108,554 A | * | 8/2000 | Kawamoto | 455/456 |
| 6,119,137 A | * | 9/2000 | Smith et al. | 707/523 |
| 6,119,155 A | | 9/2000 | Rossmann et al. | |
| 6,122,403 A | | 9/2000 | Rhoads | |
| 6,131,067 A | | 10/2000 | Girerd et al. | |
| 6,138,158 A | | 10/2000 | Boyle et al. | |
| 6,157,823 A | * | 12/2000 | Fougnies et al. | 455/406 |
| 6,161,140 A | * | 12/2000 | Moriya | 709/228 |
| 6,167,253 A | | 12/2000 | Farris et al. | |
| 6,185,184 B1 | | 2/2001 | Mattaway et al. | |
| 6,195,693 B1 | | 2/2001 | Berry et al. | |
| 6,233,608 B1 | | 5/2001 | Laursen et al. | |
| 6,247,048 B1 | | 6/2001 | Greer et al. | |

FOREIGN PATENT DOCUMENTS

| | | |
|---|---|---|
| EP | 0691619 A3 | 6/1997 |
| EP | 0812120 | 10/1997 |
| EP | 0812120 A2 | 12/1997 |
| EP | 0893760 A2 | 1/1999 |
| EP | 0812120 A3 | 5/1999 |
| JP | 5-233191 | 9/1993 |
| WO | WO 93/16550 A1 | 8/1993 |
| WO | WO 96/13814 A1 | 5/1996 |
| WO | WO 97/14244 A1 | 4/1997 |
| WO | 97 41654 | 6/1997 |
| WO | WO 97/27546 A1 | 7/1997 |

OTHER PUBLICATIONS

G.M. Voelker et al., "Mobisaic: An Information System for a Mobile Wireless Computing Environment", vol. 5, No. 10, pp. 185–190, Jan. 1, 1995, XP002062595.

C. Erlandson et al. "WAP–The Wireless Application Protocol" Ericsson Review No. 4, pp. 150–153, Stockholm, 1998, XP–000792053.

Nekkei Multimedia Magazine, pp. 109–111, Nov. 1995.

Mac Power Magazine, pp. 105 and 268, Jun. 1995.

HDTP Specifiation Version 1.1, Jul. 15, 1997; Unwired Planet, 40 pages.

HDML Specifiation Version 2.0, Jul. 1997; Unwired Planet, 56 pages.

\* cited by examiner-

VISUAL INTERFACE TO MOBILE SUBSCRIBER ACCOUNT SERVICES

CROSS-REFERENCE TO RELATED APPLICATION

This application is a continuation-in-part of U.S. patent application Ser. No. 08/570,210 filed Dec. 11, 1995 now U.S. Pat. No. 5,809,415 entitled "METHOD AND ARCHITECTURE FOR AN INTERACTIVE TWO-WAY DATA COMMUNICATION NETWORK" by Alain Rossmann, one of the co-inventors hereof.

BACKGROUND OF THE INVENTION

1. Field of the Invention

The present invention relates to user interfaces and, more particularly, to visual interfaces to mobile subscriber account services, including billing and customer service requests, wherein the visual interfaces to mobile subscriber account services are provided through mobile devices with a small screen over wireless data networks.

2. Description of the Related Art

One of the most pressing problems facing mobile service providers is delivering cost-effective mobile subscriber account services to create and maintain positive relationships with users of mobile devices. These account services may include providing the users or subscribers with updated account information, such as a rate plan, a bill due date, a prepaid balance, etc. Account services may also including handling subscriber service requests such as subscription additions, changes, and terminations.

To provide efficient means for the subscribers to use account services, many mobile service providers have established human-staffed call centers to allow the subscribers to call in and inquire about their accounts or place service requests. These traditional call centers provide convenience to their customers, but place considerable overhead onto the mobile service providers. To minimize the cost of providing mobile subscriber account services to their customers, some mobile service providers also use automated interactive voice response (IVR) systems such that the subscribers may interact with the automated interactive voice response systems to retrieve desired information or place service requests.

In a wireless communication environment, the automated interactive voice response systems may not be cost-effective. Generally, the mobile service providers have to provide a toll free number for their subscribers to interact with the interactive voice response systems. The wireless circuit connection time of a mobile phone to an interactive voice response system (the "airtime") costs a few dollars per minute and can potentially be very costly to the service providers that service a larger number of mobile customers. Furthermore, many automated interactive voice response systems in use today have complex structured menus with pre-determined choices that must be listened to and then selected by pressing a predefined key in the keypad of a mobile phone, in order to move to a next or desired choice. Such audio based hierarchical systems are often difficult to navigate, and thus, frustrate subscribers. There is, therefore, a great need for mobile service providers to provide a mechanism that allows mobile subscribers to easily access the mobile subscriber account services at anytime, from anywhere, without incurring significant additional cost to the mobile service providers.

SUMMARY OF THE INVENTION

The present invention has been made in consideration of the above described problems and needs, and has particular applicability to customers using two-way interactive communication devices capable of communicating with a server device over a wireless data network. The two-way interactive communication devices, referred to as mobile or client devices, include but are not limited to personal digital assistant (PDA) like portable devices, cellular phones, and wireless capable remote controllers. Such mobile devices typically have much less computing resources than a desktop or laptop computer does. Mobile devices have a small display screen and a phone keypad for a user to interact with the server device to access mobile subscriber account services, as opposed to a full power computer that has a full screen and a functional keyboard along with a mouse. A small form factor is very important for maintaining the size, weight, power requirements, usability and mobility of the mobile devices.

The present invention discloses a method and apparatus for providing visual interfaces to mobile subscriber account services suitable for the client devices that communicate, via the wireless data network, with a remotely located server device. The server device (also referred to as proxy server herein), generally controlled by a wireless service carrier, provides the mobile subscriber with account services such as user account information and user controllable service requests, such as switching from one calling plan to another. The direct visual interface to the mobile subscriber account services of the present invention allows mobile subscribers to efficiently, visually and interactively, access desired information and place service requests. This can be done through the limited screen and phone keypad, at anytime, from anywhere, with limited costs to the service provider and maximum convenience to mobile subscribers.

Other objects, together with the foregoing are attained in the exercise of the invention in the following description and resulting in the embodiment illustrated in the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail, to avoid unnecessarily obscuring aspects of the present invention.

The detailed description of the present invention, in the following is presented largely in terms of procedures, steps, logic blocks, processing, and other symbolic representations of data processing devices coupled to networks. These process descriptions and representations are the means used by those experienced or skilled in the art to most effectively convey the substance of their work to others skilled in the art. The present invention is a method and apparatus for providing mobile subscriber visual interface to customer care and billing systems. The method along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and, are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

The Preferred Embodiment

Figure 1:
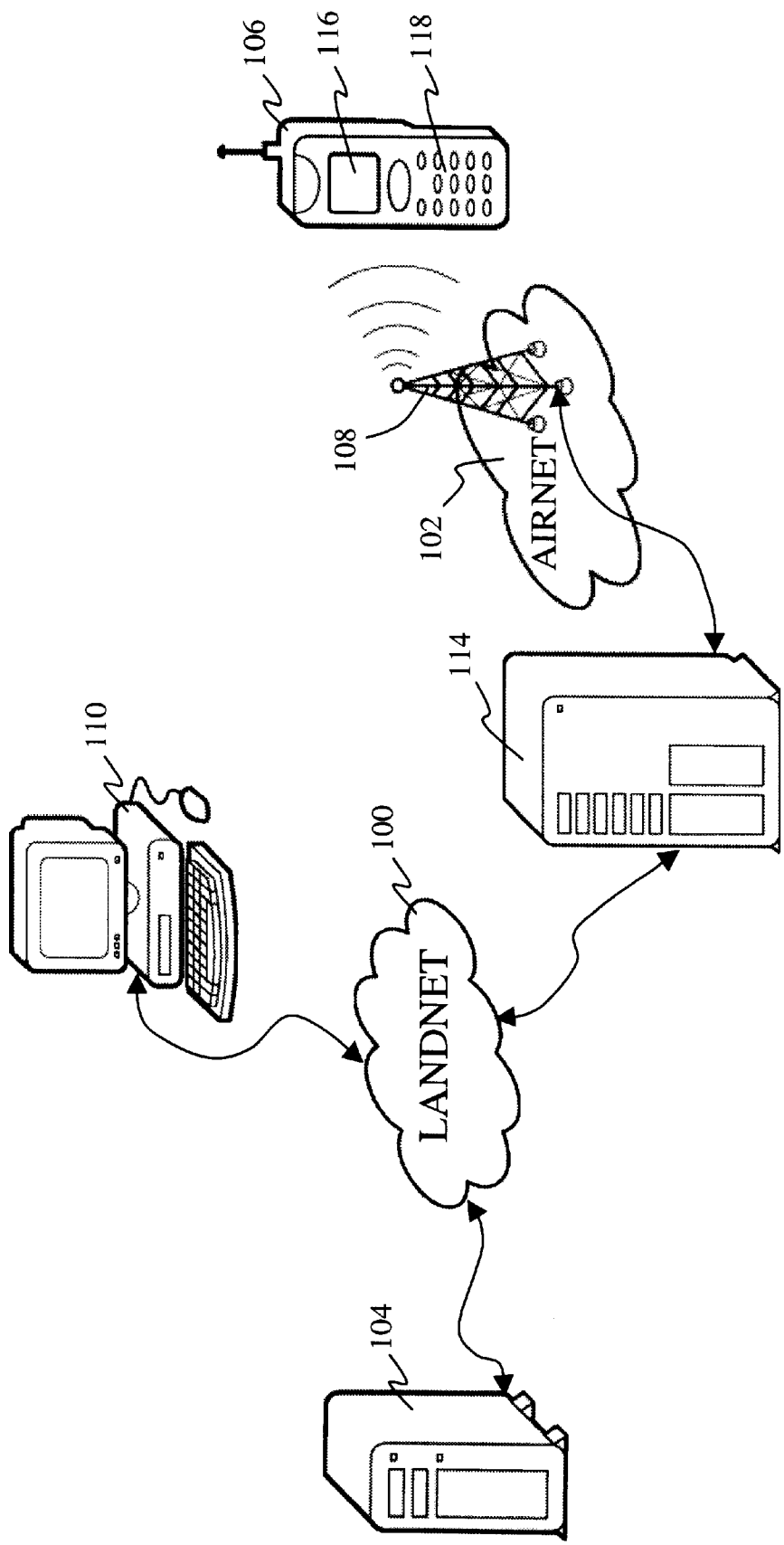
FIG. 1 illustrates a schematic configuration in which the present invention may be practiced.

Referring now to the drawings, in which like numerals refer to like parts throughout the several views, FIG. 1 illustrates a schematic configuration in which the present invention may be practiced. Landnet 100 is a landline network that may be the Internet, the Intranet and a data network of other private networks. Coupled to landnet 100 are a personal computer (PC) 108 and a network server 104. Personal computer 108 may be a desktop computer from NEC Technologies Inc., and may run a HyperText Markup Language (HTML) browser, such as Netscape Navigator from Netscape Communications Corporation (http://www.netscape.com/), via landnet 100, using HyperText Transfer Protocol (HTTP) to access information stored in network server 104 that may be a workstation from SUN Microsystems Inc (http://www.sun.com/). The information stored in network server 104 may be hypermedia information including user account information of all user accounts serviced by a carrier.

Serviced by airnet 102 are a plurality of two-way wireless interactive communication devices, referred to as mobile devices herein, though only one representation 106 is shown in FIG. 1. Mobile device 106 is one of those two-way interactive communication devices and is capable of communicating wirelessly with antenna 108 via airnet 102. For simplicity, antenna 108 also represents a wireless carrier infrastructure that generally comprises a base station and an operations and maintenance center. The base station controls radio or telecommunication links with the mobile devices. The operations and maintenance center comprises a mobile switching center performing the switching of calls between the mobile devices and other fixed or mobile network users. Further, the operations and maintenance center manages mobile account services, such as authentication, and oversees the proper operation and setup of the wireless network. Possibly, all user accounts may be managed in carrier infrastructure 108 as well. Each of the hardware components and processes in carrier infrastructure 108 are known to those skilled in the art, and not described herein to avoid unnecessarily obscuring aspects of the present invention.

Between landnet 100 and airnet 102 there is a server device 114 functioning as a proxy server which, also referred to as link server or network gateway server, that may be a workstation or a personal computer. Proxy server 114 couples airnet 102 to landnet 100. Generally, the communication protocol in airnet 102 is different from that in landnet 100. Hence, one of the functions proxy server 114 performs is to map or translate one communication protocol to another, thereby mobile device 106 coupled to airnet 102 can communicate with any of the devices coupled to landnet 100 via proxy server 114.

According to one embodiment, the communication protocol in the Internet 104 is the well known HyperText Transfer Protocol (HTTP) (or HTTPS, a secure version of HTTP), which runs on TCP (Transmission Control Protocol). It controls the connection of the HTML web browser in PC 110, to server 104, and the exchange of information therebetween. The communication protocol between mobile device 106 and proxy server 114 via airnet 102 is Handheld Device Transport Protocol (HDTP) (formerly known as Secure Uplink Gateway Protocol (SUGP)), which preferably runs on User Datagram Protocol (UDP) and controls the connection of an HDML web browser in mobile device 106, to proxy server 114. HDML stands for Handheld Device Markup Language and used to be called "TIL" (terminal interaction language). HDML, similar to HTML, is a tag based document markup language, and comprises a set of commands or statements specified in a card that specifies how information displayed on a small screen 116 of the mobile device 106. Normally a number of cards are grouped into a deck that is the smallest unit of HDML information that can be exchanged between the mobile device 106 and proxy server 114. The specifications of HDTP, entitled "HDTP Specification" and HDML, entitled "HDML 2.0 Language Reference" are enclosed and incorporated herein by reference in their entirety.

It should be noted that HDTP is a session-level protocol that resembles HTTP, but without incurring the overhead thereof. It is highly optimized for use in thin devices, such as the mobile devices, that have significantly less computing power and memory than a desktop personal computer. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

To facilitate the description of the present invention, however, it is deemed necessary to recite some of the features in mobile device 106 that make the disclosed system work more efficiently. According to one embodiment, mobile phone 106 comprises a display screen 116 and a keypad 118, which allows a user thereof to communicate interactively with mobile device 106. The keypad 118 comprises, preferably, a typical phone keypad, a pair of generic buttons and at least a pair of upward and downward arrow buttons. The typical phone keypad, as commonly seen, comprises twelve buttons. Of the twelve buttons, ten buttons are consecutively numbered, each for one of the numerals 0 to 9, respectively, one button is for "*" sign and the other button is for "#" sign. The four extended buttons, the generic and the arrow buttons, although not necessary in practicing the present invention, provide convenient and efficient means for a user to interact with mobile device 106.

Further there is a working memory (ROM and RAM), not shown, in mobile device 106. Compiled and linked processes of the present invention are typically stored in the working memory, as a client module that causes mobile device 106 to operate with proxy server 114. Upon activation of a predetermined key sequence utilizing keypad 118, for example, a microcontroller in mobile device 106 initiates a communication session request to proxy server 114 using the client module in the working memory. Upon establishing the communication session, mobile device 106 typically receives a single HDML deck from proxy server 114 and stores the deck as cached in the working memory. As described above, an HDML deck comprises one or more cards and each card includes the information required to generate a screen display on display screen 116. The number of cards in a card deck is selected to facilitate efficient use of the resources in mobile device 106 and in airnet network 102.

As used herein, a display screen is the physical display apparatus in a device, such as a 4-line by 20-character LCD screen. A screen display is the image presented on the display screen. Further, it is understood that a display screen having display lines is only for illustrative purposes, and many display screens in reality are graphics-based and do not necessarily have distinct display lines. It will be appreciated that the principles of this invention are equally applied thereto.

Figure 2A:
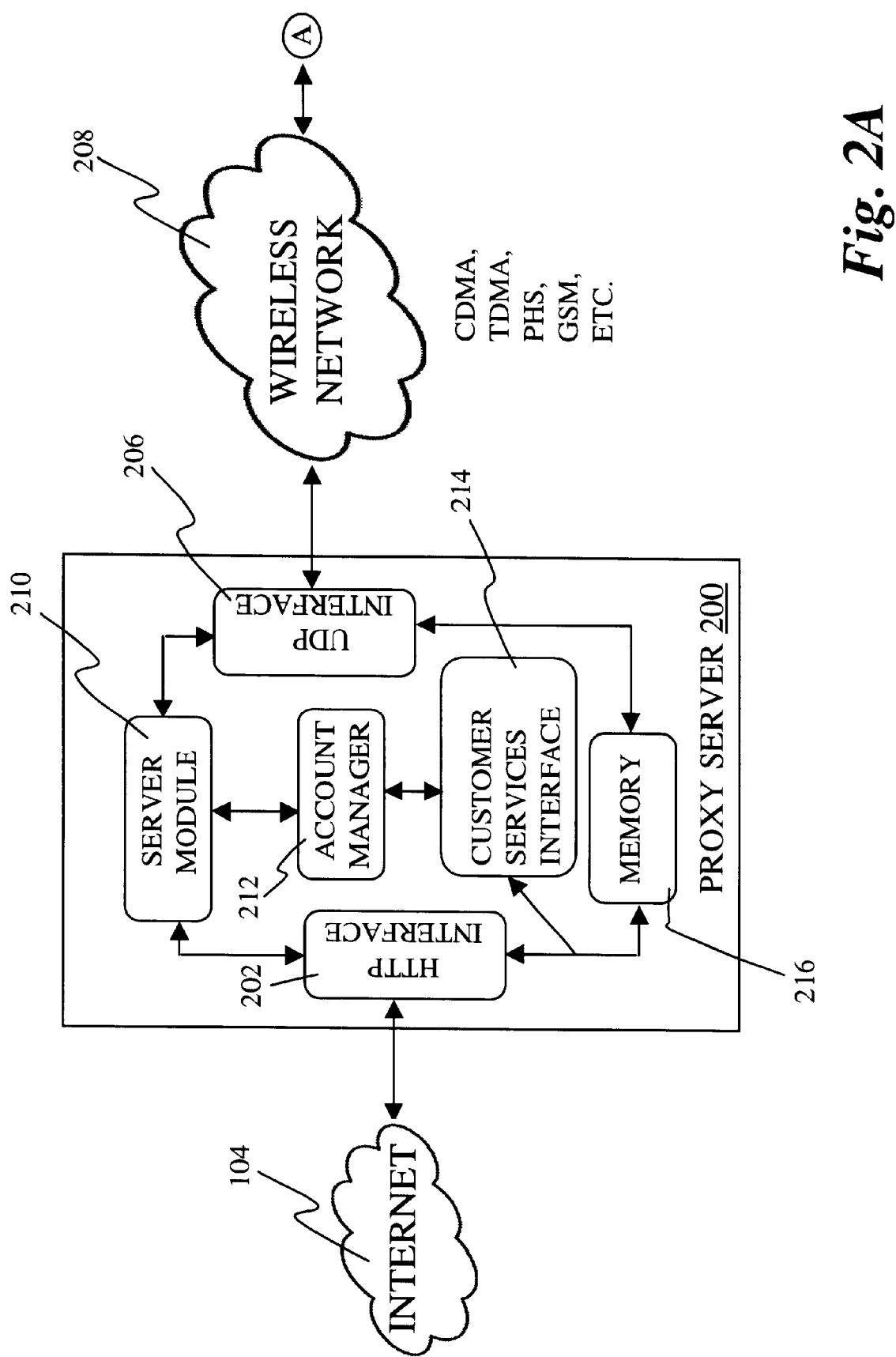
FIGS. 2A and 2B illustrate functional block diagrams of a proxy server and a mobile device according to an embodiment of the present invention.
Figure 2B:
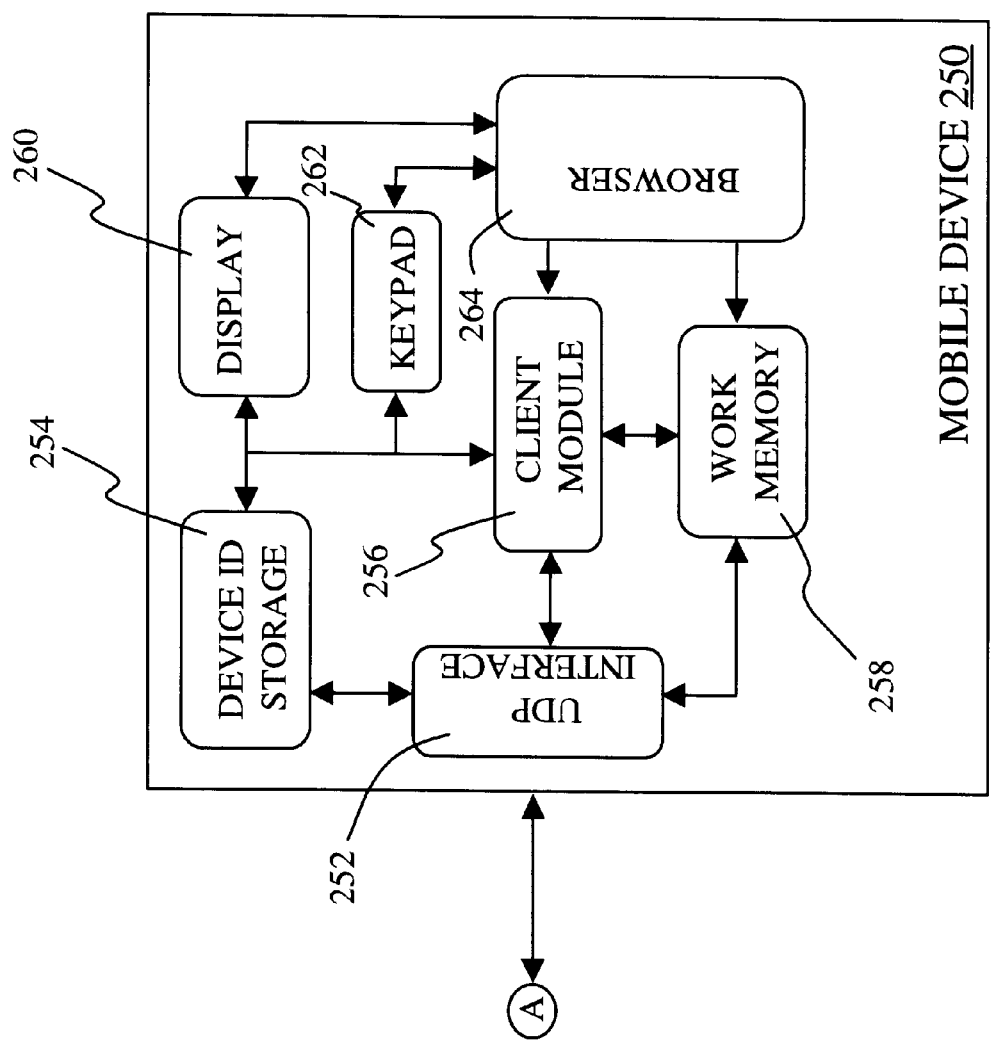

Referring now to FIGS. 2A and 2B, there are shown functional block diagrams of proxy server 200 and mobile device 250 according to an embodiment of the present invention. Proxy server 200, that may represent proxy server 114 of FIG. 1, is typically a server computer; and mobile device 250 may, for example, correspond to mobile phone 106 of FIG. 1. To avoid obscuring any aspect of the present invention, well known methods, procedures, components and circuitry in proxy server 200 and mobile device 250 are not described in detail. Further, it is understood to those skilled in the art that a server device used herein, which may perform as proxy server 200 or a web server, and may be coupled to landnet 100; means a piece of hardware equipment that comprises one or more microprocessors, working memory, buses and necessary interfaces, and other components. A server module therein means compiled and linked processes of the disclosed system loaded into the working memory, to perform designated functions through the parts and components in the server device. The same distinction between device and module is equally applied to mobile device 106, referring to, for example, a client device, and the client module as stated above.

Server device 200 comprises an HTTP interface 202 that couples to Internet 204, a UDP interface 206 that couples to wireless network 208 via a carrier's infrastructure (not shown in the figure), a server module 210 coupled between HTTP interface 202 and UDP interface 206, and an account manager 212. It should be noted that Internet 204 and wireless network 208 correspond, respectively, to landnet 100 and airnet 102 of FIG. 1, according to one embodiment of the present invention. Further, it will be appreciated that the principles of the present invention can be used with a wide variety of wireless networks. Examples of the wireless networks include Cellular Digital Packet Data (CDPD), Global System for Mobile Communications (GSM), Code Division Multiple Access (CDMA) and Time Division Multiple Access (TDMA).

Server module 210 performs traditional server processing as well as protocol conversion processing from one communication protocol to another communication protocol. According to the present embodiment, the protocol conversion processing, sometimes implemented in a separate module (referred to as a mapper herein), includes protocol conversion between UDP and HTTP, wherein the conversion is a straight data mapping relationship. It is understood to those skilled in the art that UDP interface 206 can be readily replaced by another interface module when the wireless network 206 uses another communication protocol. The same is true for the HTTP interface 202 when landnet uses a different communication protocol.

Working with server module 210, account manager 212 manages a plurality of user accounts for all the client devices serviced by server device 200. It is understood that the user accounts may be stored in another network server coupled to Internet 204. In other words, the user accounts can be kept in a database that is physically placed in any computing device coupled to server device 200, and can be collected or fetched therefrom. Hence, the scope of the present invention is not limited to server devices that must have user accounts physically therein.

Each of the client devices, such as 250, is assigned a device ID. The device ID can be a phone number of the device or a combination of an IP address and a port number, for example: 204.163.165.132:01905 where 204.163.165.132 is the IP address and 01905 is the port number. The device ID is further associated with a subscriber ID authorized by a carrier in Server device 200, as part of the procedures to activate a subscriber account for client device 250. The subscriber ID may take the form of, for example, 861234567-1905_pn.mobile.att.net by AT&T Wireless Service; it is nevertheless a unique identification to client device 250. In other words, each of client devices serviced by server device 200 has a unique device ID that corresponds to a respective user account in server device 200. The following description is focused on client device 250 and its associated account, it shall be appreciated by those skilled in the art that the description is equally applied to all client devices in communication with server device 200.

Figure 3:
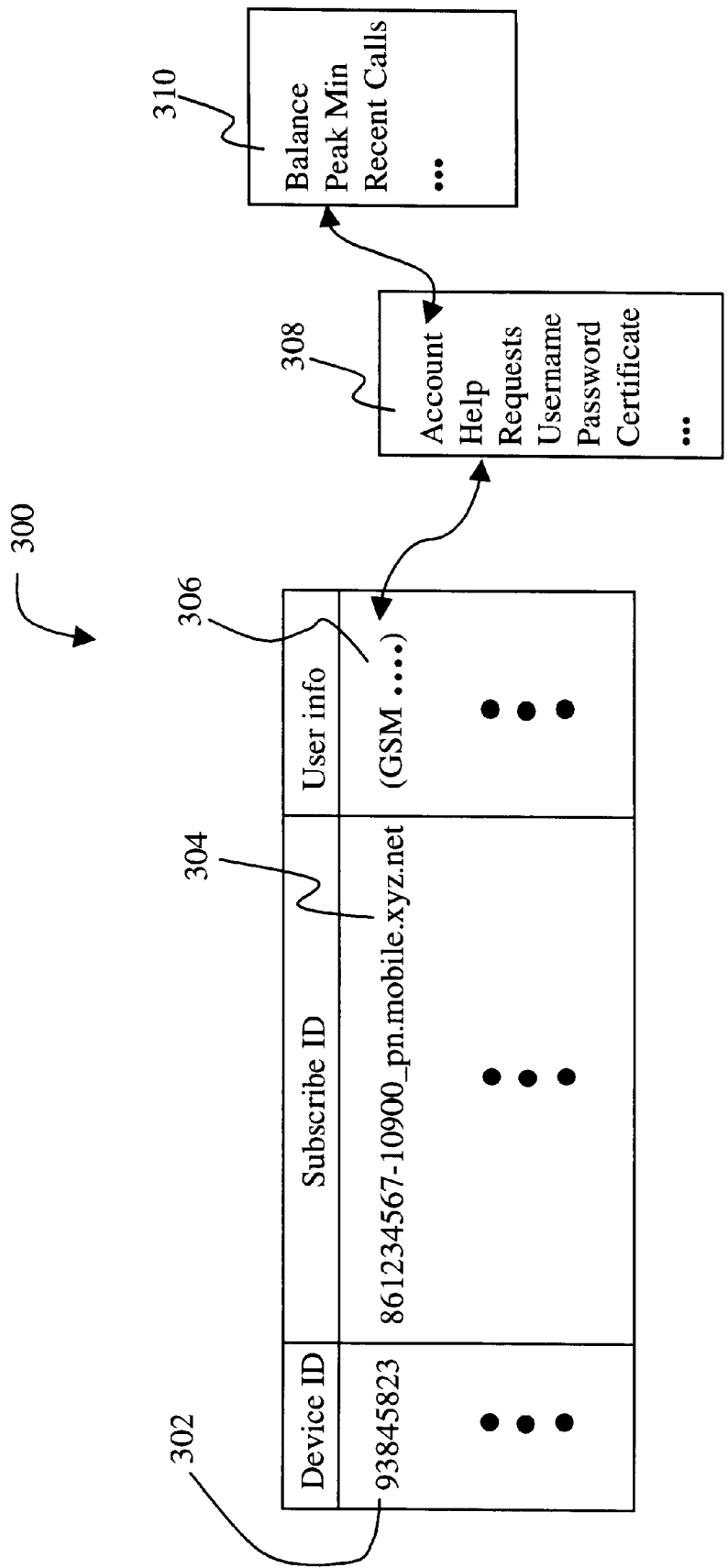
FIG. 3 depicts an account structure used in the description of the present invention.

Subscribers or user accounts, indexed by each respective device ID, are represented by a data structure 300 as shown in FIG. 3. Each record in data structure 300 comprises information about a subscriber, such as device ID 302, subscriber ID 304 and user info 306 for the account indexed device ID 93845823. User info 306 may include the account configuration information, for example, device ID 302, may be a mobile phone that is pre-configured for a GSM network and, probably, may be provided with an option to switch to a CDPD network if necessary. Further user info 306 may include pointers or linkages to other account related information, such as account index information 308 and further detailed account information 310, as an example in FIG. 3. Account index information 308 along with all detailed information, like account information 310, can be physically located together with data structure 300 or separately in one or more devices coupled to the Internet. When a request is made to retrieve specific information about an account, either the device ID 302 or the subscriber ID 304 thereof must be provided.

Returning to FIG. 2B, client device 250. includes a UDP interface 252 that couples to carrier network 208 via a Radio Frequency (RF) transceiver (not shown in the figure) to receive incoming and outgoing data signals. Device identifier (ID) storage 254 supplies a device ID to UDP interface 252. The device ID identifies a specific code that is associated with client device 250 and directly corresponds to the device ID in the user account provided in server device 200.

In addition, client device 250 includes a client module 256 that performs many of the processing tasks performed by client device 250 including establishing a communication session with server device 200 via carrier network 208, requesting and receiving data from carrier network 208, displaying information on a display screen 260 thereof, and receiving user input from keypad 262 as well. The client module 256 is coupled to UDP interface 252 for the establishment of a communication session and the requesting and receiving of data. Additionally, the client module 256 operates, among other things, a browser 264, commonly referred to as micro-browser, requiring much less computing power and memory than the well-known HTML browser does. The microbrowser is, preferably, a Handheld Device Markup Language (HDML) micro-browser from Unwired Planet, Inc. located at 800 Chesapeake Drive, Redwood City, Calif. 94063. Additional details on accessing a (proxy) server device from a mobile device including a (micro) browser is described in the above-mentioned U.S. patent application Ser. No. 08/570,210.

Prior to describing the invention in further detail, several illustrative examples of applications that can be implemented according to the principles of this invention are described. These applications are illustrative only and are not intended to limit the invention to the particular applications and features described.

Figure 4:
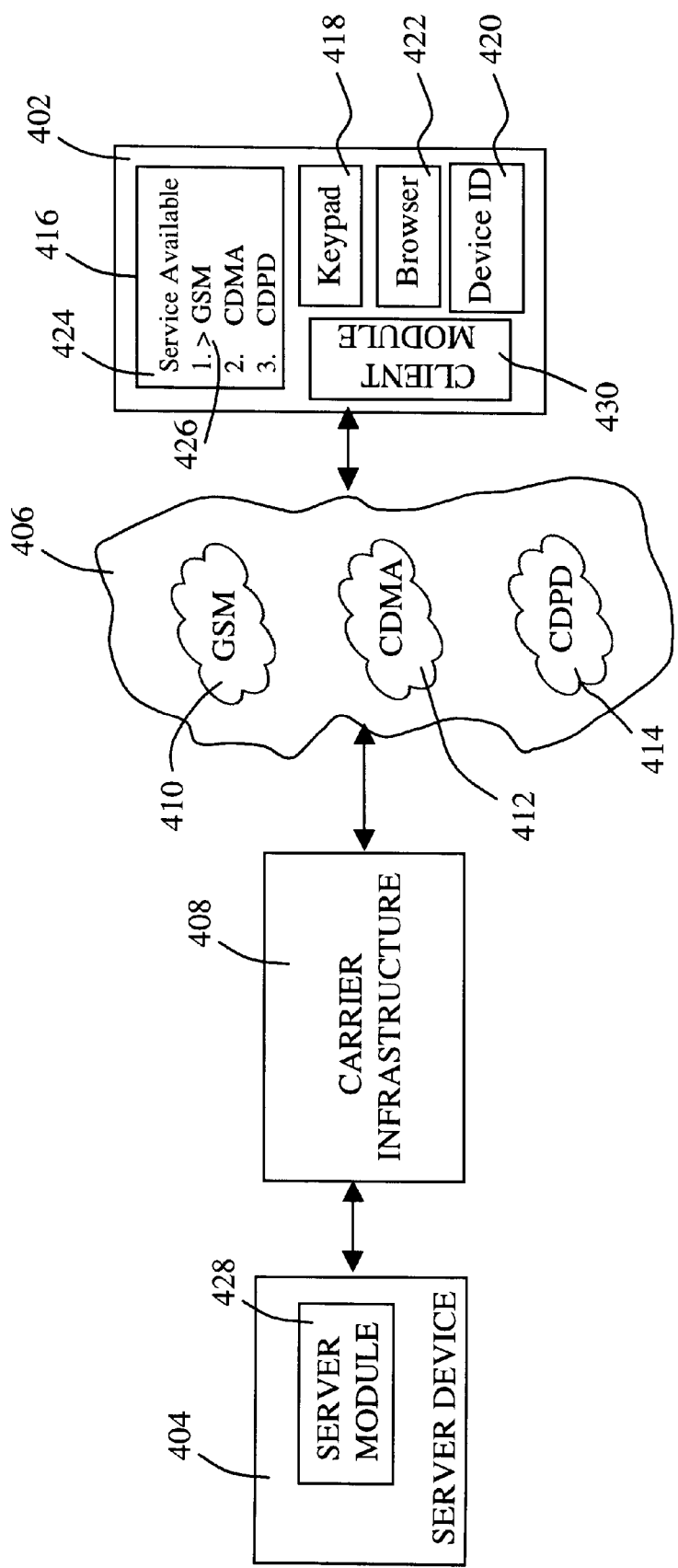
FIG. 4 depicts a system in which a service request can be placed by practicing the present invention.

Referring now to FIG. 4, there is shown an exemplary system in which the present invention may be practiced to place a service request through a mobile device. Mobile device 402 is serviced by server device 404 via carrier wireless network 406 operated by carrier infrastructure 408. Carrier wireless network 406 comprises a number of wireless networks, for example, GSM 410, CDMA 412 and CDPD 414, each having its own communication methods and characteristics. In other words, a carrier may provide wireless services through a number of different wireless networks that may or may not be overlapping in a particular geographic area. Further each wireless network, subscribed by respective groups of customers, may have a different airtime charge rate depending on the time and locations of the use thereof.

Similar to mobile device 250 of FIG. 2A, mobile device 402 in FIG. 4 comprises a display screen 416, a keypad 418 and a working memory 420 that includes a device identification thereof. Preferably, mobile device 402 further comprises an HDML micro-browser 422. As a part of the procedures to activate mobile device 402 with a carrier or carrier infrastructure 408, mobile device 402 is initially pre-configured to operate in GSM wireless network 410.

For some reasons that may include unavailability of the GSM wireless network in certain geographic areas or promotion of other wireless networks, a user of mobile device 402 may decide to switch from the pre-configured GSM wireless network to CDPD wireless network, namely the user now prefers to use CDPD wireless network 414 for communication by mobile device 402. Generally, the request can incur a cost to the carrier since the user has to call in and make the request through a human operator or a voice interactive system, which typically takes up some airtime. However, the same request may be made using the teachings of the present invention without incurring additional costs to the carrier as described below.

Provided by the mobile subscriber account services, a screen display 424 is displayed to allow the user to view the number of wireless networks that are available to the user. It is now understood that the information can be provided with respect to the corresponding user account maintained in server device 404. According to the present embodiment, screen display 424 is provided in an HDML choice card, preferably cached in the memory of client device 402. The choice card comprises a list of choices, each choice corresponding to one available wireless network. To be more specific, screen display 424 shows that there are three choices, GSM, CDMA and CDPD. Each choice represents a wireless network that may be used as a carrier infrastructure 408. It should be noted that the number of the choices being displayed and the actual wireless networks are not necessarily related to the principles of the present invention. They are only for illustrative purposes herein and typically are related to actual implementation preference of the carrier.

As shown in screen display 424, the pre-configured GSM wireless network is indicated by a choice or element indicator 426 that can be moved downward through keypad 418. If the user selects the third choice, i.e. CDPD, a selection or chosen preference is made after a predefined key is pressed. A client module 430 interprets the chosen preference and then generates a message comprising the chosen preference. The message is forwarded to server device 404 using HTTP via carrier infrastructure 408.

Upon receiving the message from client device 402, server module 428 executes the request by reassigning the chosen preference, for example, to user info 306 of FIG. 3. More specifically, GSM in user info 306 is now replaced by CDPD, which can cause all subsequent wireless communications to that particular mobile device to be carried across the CDPD wireless network 414.

It should be noted that the user utilizes a client device, such as a cellular telephone, that is capable of communicating over a data capable wireless network. More specifically, a cellular telephone is not a combination of a computer and a wireless communication module as seen in laptop portable computers. In addition, the user enters data using only the standard phone keypad. Thus, a client device such as cellular telephone eliminates the need for a computer keyboard or a mouse or for a sophisticated touch screen that recognizes motion of a pointing object. This is important to maintaining the size, weight, power requirements, usability and mobility of the client device. Furthermore, as an example, the service request to switch from one wireless network to another wireless network, can be made by the user at anytime from anywhere through the client device without incurring additional cost to the carrier. Typically the user receives results of the service requests in a few seconds.

Referring now to FIGS. 5A–5F, there are illustrated a series of screen displays on display screen 500 of a client device according to one embodiment. When the client device is turned on, an initial screen display 502 is displayed on display screen 500. Referenced by 512 is a soft key generally associated with one of the generic buttons in the keypad of the client device 106 of FIG. 1. As described above, the soft key provides a mechanism to map a generic button into a specified button, namely to press the generic button is equivalent to pressing an "OK" button when the soft key OK is displayed. Again, the functionality of this invention is independent of specific soft keys. Other means may be used to assign the soft key to one of the buttons existing in a standard phone keypad, such as the "#" key for a soft key on the right side of display screen 500.

Screen display 502 may be supplied by one of the choice cards in a deck cached in the working memory of the client device. Screen display 502, shows display element 504 having textual information. Display element 504 is used to indicate what is the current screen display. Three selectable elements 506, 508, 510 are also shown, with selectable element 506 being selected as indicated by an element selection character or element indicator 514. It is understood that having selectable element 506 initially selected is an implementation preference. An important aspect herein is that only one selectable element can be selected at a time.

In this embodiment, a selected selectable element 506 is visually indicated to the user by element indicator 514 that is placed after the numeric label "1" indicating that it is the first choice in the menu in screen display 502 for that display element. However, any other method, such as inverse image or video, a different element selection character, or the position of the selected element being always at the top or bottom of the display, could be used to indicate the specific selectable element 506 selected without having an impact on the operation of this invention.

The user can select a different element by vertically scrolling element indicator 514 up or down. The specific method used to move element indicator 514 up or down on display screen 502 is not an essential feature of this invention. In view of this disclosure, those skilled in the art can implement the invention with any desired mechanism for moving element indicator 514. For example, a thumb wheel, a mouse, or a rocking controller, as available in some video game machines, would work equally well as mechanisms for scrolling element indicator 514.

In accordance with the present embodiment, screen display 502 includes three choices. First choice 506 places the client device to a voice mode in which a user can dial a phone number to proceed with a normal phone call. Second choice 508 enables the user to navigate the Internet. Third choice 510 allows the user to view or access "Customer Services".

Figure 5A:
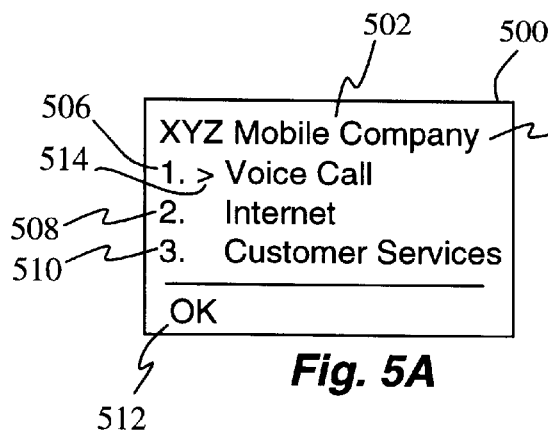
FIGS. 5A to 5F demonstrate an exemplary mobile subscriber visual interface by illustrating a sequence of screen displays according to an embodiment of the present invention.
Figure 5B:
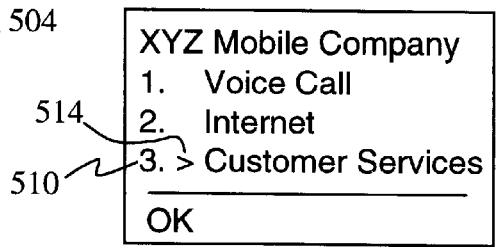
Figure 5C:
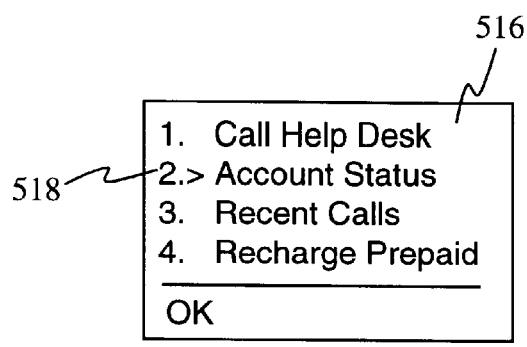

FIG. 5B shows that element indicator 514 has been moved down to "Customer Services" 510. Generally, the client device makes a connection request to a server device that in turn returns the requested information depending on the exact setup of the accessed account. The returned information, typically cached first, is then displayed in screen display 516 as shown in FIG. 5C. Regardless of what element is being selected by default, the user interested in the account status selects second choice "Account Status" 518. The associated account information is fetched and displayed. As described before, the exact location of the account information may be in the server device or a web device that couples to the server device via the Internet. In the case that the detailed account information is in the web device, the detailed account information must be pulled or fetched therefrom to the server device. It is generally understood that information fetching from a web device via the Internet may be achieved using the Hypertext Transport Protocol (HTTP).

Figure 5D:
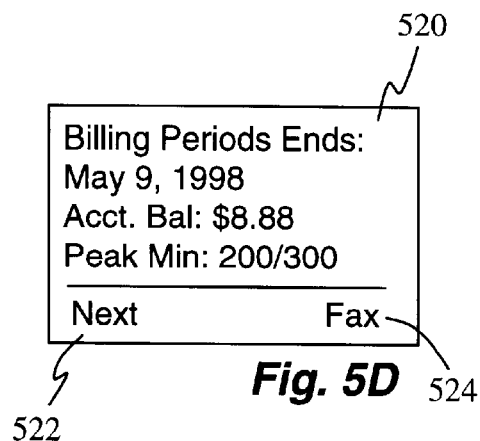
Figure 5E:
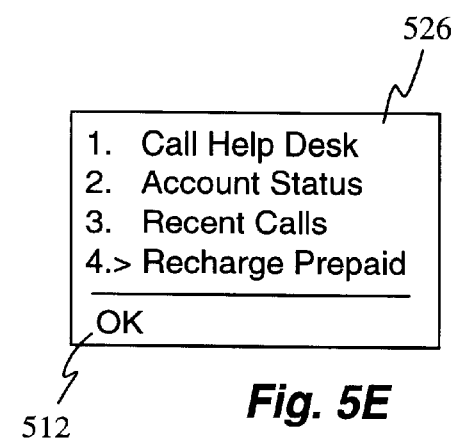
Figure 5F:
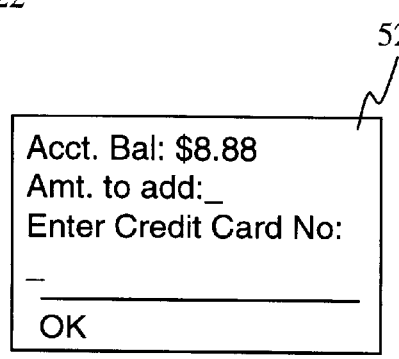

As shown in FIG. 5D, the detailed account information is displayed as a new screen display 520. There are two soft keys indicators 522 and 524. Soft key indicator 522 indicates that display screen 520 has more information to be displayed. The additional information will be displayed if the associated key on the mobile device is pressed. Soft key indicator 524 provides convenient means for the user to fax the account status to a nearby fax machine or to forward to a specified email address. FIG. 5E displays screen display 526 provided the user chooses the fourth choice "Recharge Prepaid" in screen display 516 of FIG. 5C. A corresponding screen display 528 is displayed when soft key indicator 512 is pressed. Screen display 528 in FIG. 5F shows the updated account balance and allows the user to enter a new amount to add to the balance by supplying a sequence of alphanumeric characters that may represent credit card numbers, a financial banking account and the like.

Figure 6A:
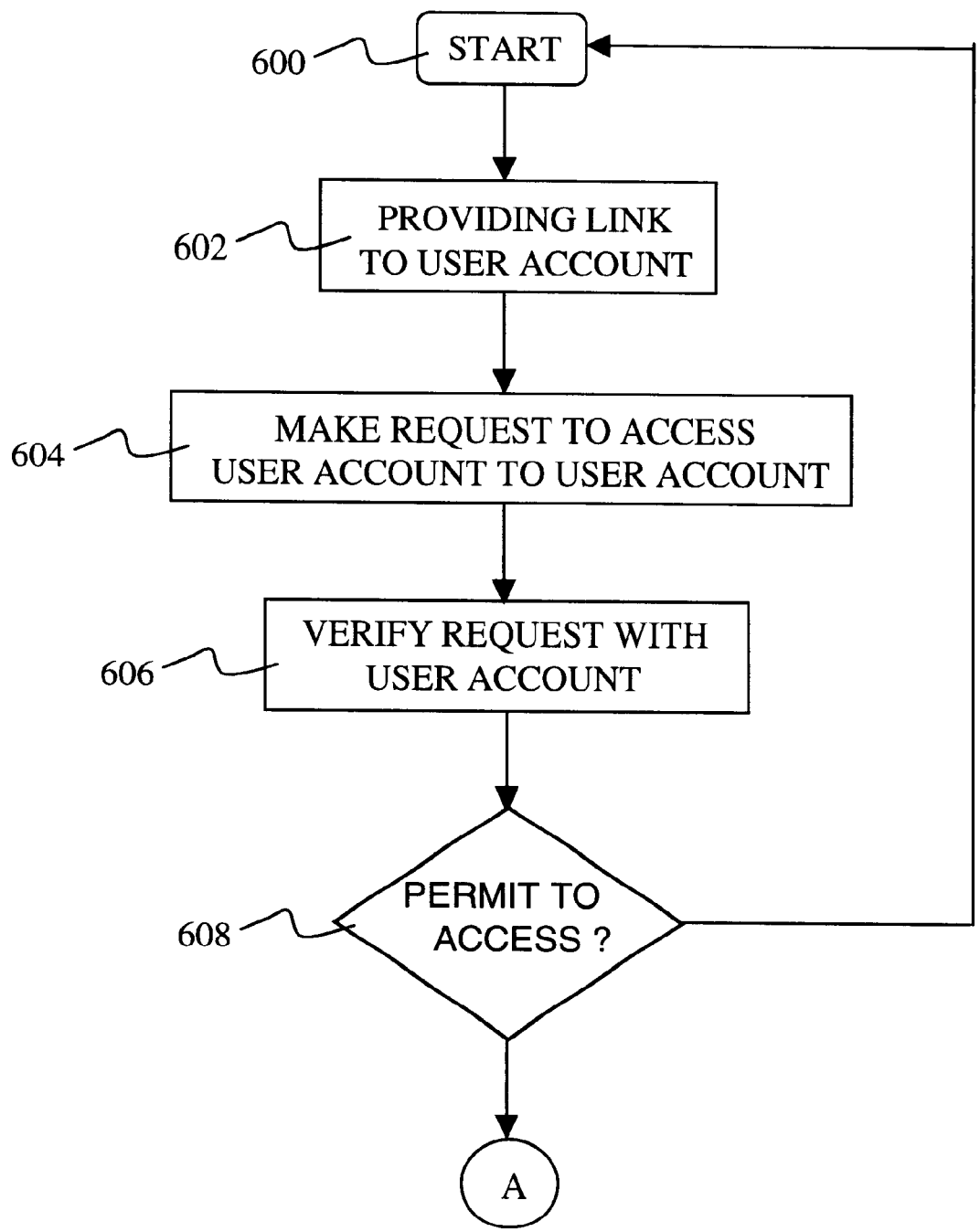
FIGS. 6A and 6B illustrate a process flowchart of the present invention according to one embodiment.
Figure 6B:
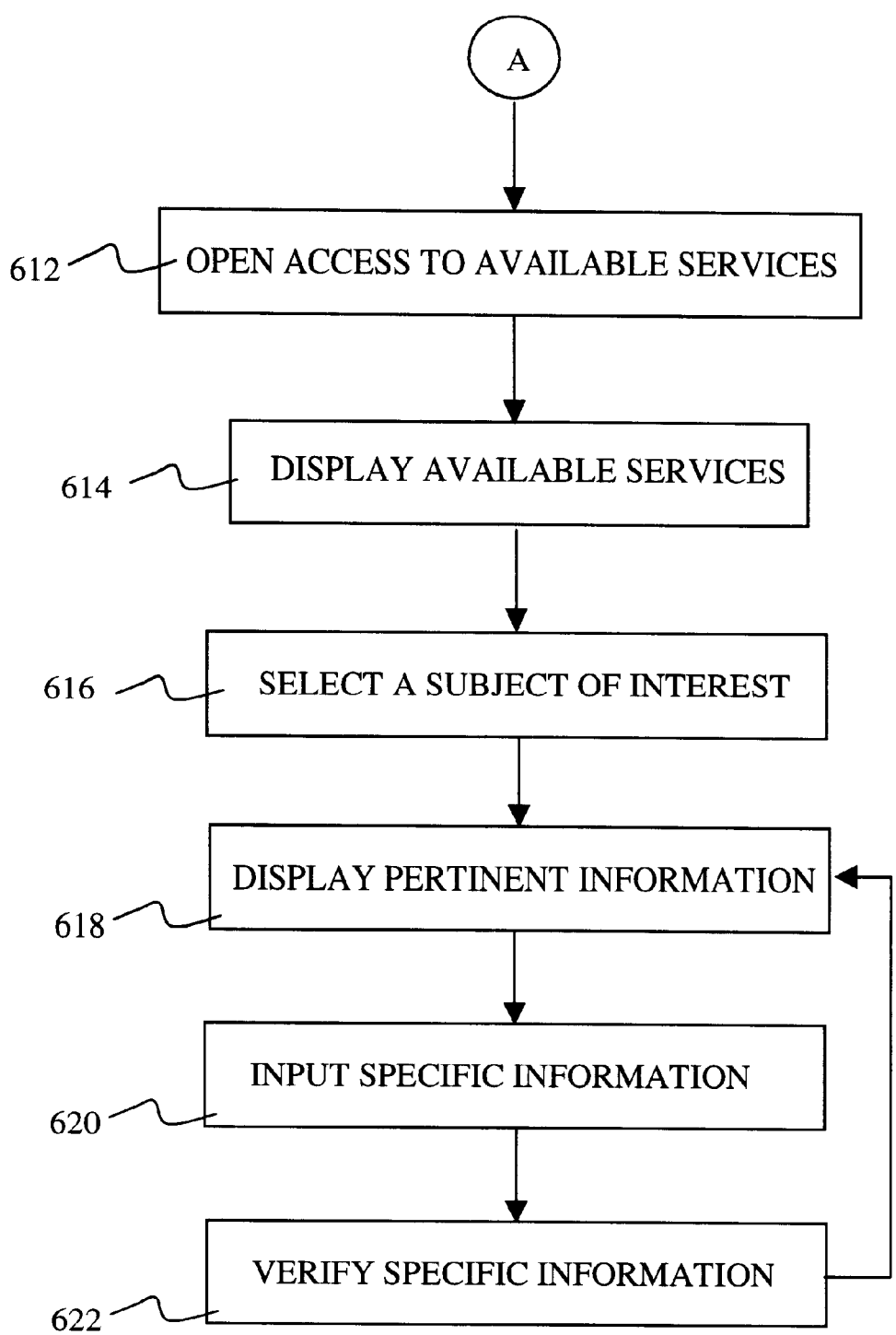

FIGS. 6A and 6B illustrate a process flowchart according to one embodiment of the present invention and shall be understood in conjunction with the rest of the figures. At 600, a client device is in a state that displays a menu comprising a link to access mobile subscriber account services that may further provide entries or choices to a plurality of aspects of the account services including user accounts, help, service requests, etc. At 602, a choice is made by a user to access one particular aspect of the mobile subscriber account services, for example, user account, and the choice provides a link to the user account. The link, for example, may be a URL address typically including the device identification of the client device, one possible example is, http://www.xyzmobile.com/subscribers/accountID&"93845823", wherein the device identification 93845823 is included.

Upon activating a predefined key in the phone keypad, the client device, at 604, makes a request to communicate with a server device that is identified by the IP address. The server device hosts the user account or provides a gateway to the user account that may be located in another device coupled to the server device via a data network, e.g. the Internet. To prevent possible unauthorized access to the user account with respect to the client device, an account manager in the server device, at 606, proceeds with an access verification that may include a verification of the request by, for example, comparing the device identification from the client device with a corresponding device identification in the user account. If the device identifications are matched, the access is permitted at 608. Further, if necessary, a secure session may be established by exchanging encryption keys from both sides. The detailed description of establishing a secure communication session between the client device and the server device is provided in commonly assigned U.S. patent application Ser. No. 08/966,988 entitled "Method and System for Secure Lightweight Transactions in Wireless Data Networks" Hanqing Liao, et al, which is hereby incorporated by reference in its entirety.

At 612, the server device consolidates all available account services provided by the carrier to this particular user account in a form transportable in the wireless network to the client device. The form may be represented in a markup language, such as HDML, supported by a micro-browser in the client device. At 614, the micro-browser in the client device interprets the form and causes the client device to display all available account services to the user. With the available account services displayed, the user may perform a number of tasks including viewing the account balance at 618 and inputting new information to the account such as credit card information to bring the balance up. The user may also place a server request at 620 and further confirm the performed tasks at 622 by reloading the account status if the performed tasks were to add a new amount to the balance using a credit card.

It can be appreciated by now that the present invention provides efficient, visual and interactive interfaces to mobile subscriber account services. Apart from existing account services systems, such as interactive voice systems, the present invention allows users to navigate, via a wireless data network, all aspects of the account services on a small screen with a phone keypad, without incurring additional costs to the service providers. It should be noted that the teachings of the present embodiment.are not limited to mobile subscriber account services. The teachings of the present invention could also be used to provide financial services to subscribers. For example, banking services may be provided to mobile device subscribers. Thus, mobile device subscribers could access bank account balances and make electronic fund transfers.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A method for providing a visual interface between a display screen of a client device that includes a keypad and services offered by a service provider, said method comprising:

receiving a service request from said client device for accessing an account manager, on a server device across a wireless data network using a first communication protocol, said service request containing a first device identifier;

accessing a user account in a user account database with said account manager;

comparing said first device identifier from said client device with a second device identifier in said user account; and sending information from said account manager to said client device if said first device identifier and said second device identifier correspond using said first communication protocol, said information used by said client device for displaying a screen display comprising a plurality of user interface components on said display screen for manipulating said user account.

2. The method as recited in claim 1, further comprising:
   detecting the selection of one of the user interface components in the screen display using the keypad;
   retrieving content information from the server device in accordance with the one of the user interface components in the screen display; and
   displaying the content information on said display screen of said client device.

3. The method as recited in claim 2, wherein said retrieving said content information from the server device comprises:
   requesting the content information from the server device, through a landnet using a second communication protocol; and
   mapping said content information from said second communication protocol to said first communication protocol.

4. The method as recited in claim 2, wherein said retrieving content information comprises:
   retrieving the content information in a first data format, said first data format being a native format of said client device.

5. The method as recited in claim 2, further comprising:
   accepting specific information in accordance with the content information displayed on the display screen;
   forwarding the specific information from said client device to the server device; and
   updating said user account according to the specific information received from the client device.

6. The method as recited in claim 5 further comprising:
   accessing the content information identified by a selected user interface component; and
   displaying the content information that has been incorporated with the specific information.

7. The method as recited in claim 5, wherein the specific information comprises a sequence of alphanumeric characters.

8. The method as recited in claim 1, the method further comprising:
   buffering the plurality of the user interface components in a memory in the client device.

9. The method as recited in claim 1, wherein said device identification comprises an IP address of the client device.

10. A method for providing visual interfaces to mobile subscriber account services on a display screen of a client device that includes a keypad, the method comprising:
    accepting in a server device a first service request from the client device to access the mobile subscriber account services, the first service request comprising a first device identification, said mobile subscriber account services accessible from said server device that is coupled to the client device via a wireless data network operating a first communication protocol, said first protocol a native protocol of said client device, wherein the server device comprises an account manager managing a user account in a user account database;
    accessing said user account in said user account database from said account manager;
    comparing said first device identification from said client device with a second device identification in said user account; and
    mapping said first service request from the first communication protocol to a second communication protocol to create a second service request and sending said second service request to a second server device with said second communication protocol if said first device identification and said second device identification correspond.

11. The method as recited in claim 10 wherein said accepting said first service request further comprises:
    accepting a specific choice from a set of choices on the screen display from a user using the keypad; and
    creating said second service request for specific content information from the server device in accordance with the specific choice selected from the screen display.

12. The method as recited in claim 11 wherein said accepting said first service request further comprises:
    accepting user specified information in accordance with the specific choice;
    placing the user specified information in said second service request to the server device.

13. The method as recited in claim 10, wherein the first communication protocol is a wireless network communication protocol.

14. The method as recited in claim 10, wherein the first service request comprises a markup language.

15. The method as recited in claim 10, wherein the second communication protocol comprises hypertext transfer protocol.

16. The method as recited in claim 10 further comprising:
receiving a first response from said second server device operating with the second communication protocol; and
mapping said response from the second communication protocol to the first communication protocol to create a second response; and
sending the second response to the client device via the wireless data network.

17. A method for performing a commercial transaction with a user having a wireless client device by providing a visual interface between a display screen of a client device that includes a keypad and services offered by a service provider, said method comprising:
sending a message to said wireless client device, said message causing said wireless client device to display more than one service offering on said display screen of said wireless client device;
accepting a first service request from said wireless client device in a first protocol, said first service request including a first device identification, said first service request specifying a service desired by said user, said first protocol being a native protocol of a client program on said client device;
accessing a user account in a user account database to obtain a second device identification;
comparing said first device identification from said wireless client device with said second device identification from said user account; and
mapping said first service request from said first protocol to a second service request with a second communication protocol used by a server associated with said service desired by said user and sending said second service request to said server associated with said service desired by said user if said first device identification and said second device identification correspond.

18. The method as recited in claim 17 further comprising:
accepting user entered information in said first service request that further define said first service request.

19. The method as recited in claim 18 wherein said user entered information comprises alphanumeric data.

20. The method as recited in claim 18 wherein said user entered information comprises a monetary value.

21. The method as recited in claim 17 wherein said service desired by said user comprises pre-paid cellular telephone service.

22. The method as recited in claim 17 wherein said service desired by said user comprises a switch from a first wireless network to a second wireless network.

23. A processing system comprising:
a server module to accept a first service request to access mobile subscriber account services from a mobile client device over a wireless data network using a first communication protocol, the first protocol a native protocol of the client device, the first service request comprising a first device identification; and
an account manager to manage user accounts in a user account database, to access a user account in the user account database in response to the first request, and to compare the first device identification from the client device with a second device identification in the user account;
wherein the server module further is to map the service request from the first communication protocol to a second communication protocol to create a second service request and to send the second service request to a server device over a second data network using the second communication protocol if the first device identification and the second device identification correspond.

24. An apparatus for providing visual interfaces to mobile subscriber account services on a display screen of a client device that includes a keypad, the apparatus comprising:
means for accepting in a server device a first service request from the client device to access the mobile subscriber account services, the first service request comprising a first device identification, the mobile subscriber account services accessible from a server device that is coupled to the client device via a wireless data network operating a first communication protocol, said first protocol a native protocol of said client device, wherein the server device comprises an account manager managing a user account in a user account database;
means for accessing the user account in the user account database from the account manager;
means for comparing the first device identification from the client device with a second device identification in the user account; and
means for mapping the service request from the first communication protocol to a second communication protocol to create a second service request and sending the second service request to a second server device with the second communication protocol if the first device identification and the second device identification correspond.

25. A processing system comprising:
a processor; and
a storage facility accessible to the processor and storing instructions which, when executed by the processor, cause the processing system to execute a process comprising:
sending a message to a mobile client device via a wireless network, the message causing the client device to display a plurality of user account service offerings on a display screen of the mobile client device,
receiving a first service request from the mobile client device via the wireless network using a first communication protocol, the service request containing a first device identifier,
accessing a user account in a user account database,
comparing the first device identifier from the mobile client device with a second device identifier in the user account, and
mapping the first service request from the first communication protocol to a second communication protocol to create a second service request, and
sending the second service request using the second communication protocol to a server configured to provide an account service if the first device identification and the second device identification correspond.

* * * * *